United States Patent [19]

Johnson

[11] 4,411,547
[45] Oct. 25, 1983

[54] BRACED STRUCTURAL MEMBER

[76] Inventor: Alfred E. Johnson, P.O. Box 1207, Cardston, Alberta, Canada, T0K 0K0

[21] Appl. No.: 189,578

[22] Filed: Sep. 23, 1980

[30] Foreign Application Priority Data

Jul. 18, 1980 [CA] Canada ................................. 356546

[51] Int. Cl.³ ............................................. F16B 1/00
[52] U.S. Cl. ................................. 403/205; 403/403; 52/93
[58] Field of Search ............ 403/205, 312, 403, 232.1, 403/402, 401; 52/657, 93, 92

[56] References Cited

U.S. PATENT DOCUMENTS 2,688,167  9/1954  Wilson ................................. 403/402
3,846,030  11/1974  Katt ................................. 403/312 X

FOREIGN PATENT DOCUMENTS 704836  3/1965  Canada ................................. 52/93
566377  11/1923  France ................................. 403/205

*Primary Examiner*—Andrew V. Kundrat
*Attorney, Agent, or Firm*—Dressler, Goldsmith, Shore, Sutker & Milnamow, Ltd.

[57] ABSTRACT

A haunch connector for use in building trusses comprises two channels secured together at an angle and clamping means for clamping elements of the truss into the channels. The construction permits the assembly of large trusses without the need for pre-drilling old holes in the ends of the trusses, thus strengthening the points of connection of the structural elements and permitting limited adjustment of the angles of adjacent elements within desired limits.

3 Claims, 4 Drawing Figures

BRACED STRUCTURAL MEMBER

This invention relates to haunch connectors also known as knees, for use in building trusses.

Trusses have achieved wide acceptance in the art of building, primarily because of the ease with which they can be manufactured in a factory and shipped to a building site, where they are assembled to form a complete building.

The prefabrication of complete trusses for small structures such as houses presents no technical difficulty, since the complete truss can be manufactured, easily placed on a truck bed, and carried to the construction site. However, with trusses of substantial size such as those used in the construction of barns and large storage buildings it is clearly not possible to prefabricate the whole assembled truss since such trusses are of a size such that they are not transportable, or at least are not transportable on conventional vehicles. For this reason, trusses for use in large buildings are prefabricated in parts, and later assembled on site.

It thus becomes necessary to provide for safe and convenient connection of the several parts of a prefabricated truss on site, often using unskilled labour and a minimum of ordinary tools and materials. To this end, many proposals have been made for the prefabrication of building frames such as Woodworth in U.S. Pat. No. 2,653,360, granted on Sept. 29, 1973.

The "knee" for joining an upright post to a beam proposed by Woodworth comprises a pair of plates 10,11 joined together at an angle and braced together by a brace 21 which maintains the angular orientation of the plates. The knee proposed by Woodworth is connected to the wooden structural elements by a bolt and by a clamp like structure to a knee cap. The two structural elements which are mitered and rabbeted are, placed alongside the two plates, and are secured thereto by two bolts and by a cap plate which in turn is bolted to the knee.

A disadvantage of the Woodworth construction is difficulty of assembly, the requirement for precise formation of the miter and rabbets prior to location of the parts in relation to each other before the knee can be assembled to the frame and limited resistance to racking loads.

It is the purpose of the present invention to provide a haunch connector that can easily be assembled to the wooden elements of a truss, on site, without the requirement for predrilling or rabbeting of any of the wooden elements, while providing for adjustment of the specific angular orientation of the parts of the structure once assembled and strengthening of the structural elements in the area of the joint.

To this end I provide a haunch connector for connecting two adjacent structural elements in a building construction at a given angle, comprising a pair of metal channels joined together at said angle, a knee brace connecting said channels for rigidly maintaining a fixed angular relationship between the channels of the pair, clamping means for attachment to said channels and for surrounding the structural elements and clamping them into the channels, and means for tightening the clamping means to grip the structural elements between the clamping means and the channels.

The above arrangement overcomes the problems of the prior art. The channels readily accommodate the ends of the structural elements that are to be joined, and the clamps surround the structural elements and can be tightened to compress them into the channels so that the two structural elements to be joined assume the angular relationship of the channels. Adjustment can be affected by loosening the clamping means, shimming in known manner between the channels and the structural elements, and retightening the clamping means. Further, by extending the channels a predetermined distance, for example down a wooden column, the strength of the column is increased and a saving of materials can be realized.

Embodiments of the invention are shown in the attached drawings, in which.

Figure 1:
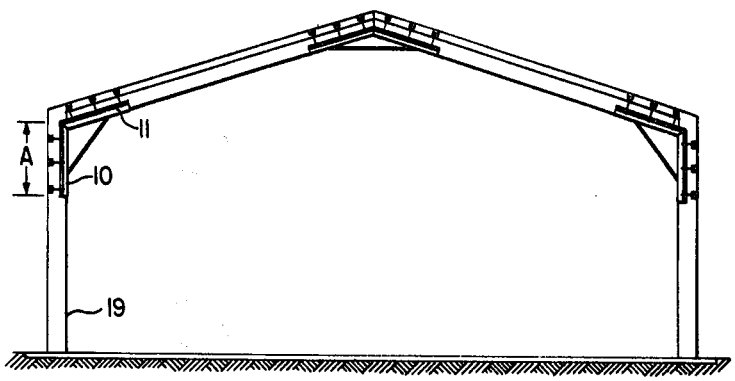
FIG. 1 is a view of a truss embodying the haunch connector of the invention.
Figure 2:
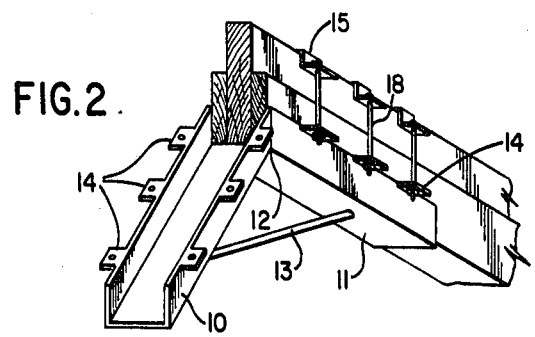
FIG. 2 is a perspective view of a haunch connector.

In the drawings 10 and 11 are a pair of channel sections, made for example from a suitable material such as steel, that are welded together at 12 to form an angular structure. The chord 13 is welded to the channels to form a rigid triangular construction. Referring to FIG. 1, three connectors of the type described above will be used, one at the peak of the roof and one at each edge of the roof. Along the flanges of each of the channel elements 10 and 11 are arranged a number of outwardly projecting ears 14 which are predrilled to receive bolts in a manner to be described below. Also part of the combination are clamping strips 15, also predrilled to receive the aforementioned bolts.

Figures 3A, 3B:
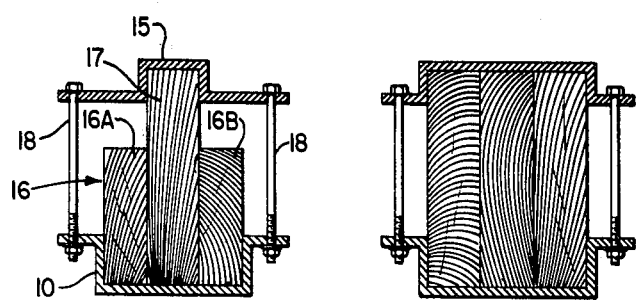
FIGS. 3a and 3b are cross-sections of different embodiments of clamping elements for different wooden elements.

Referring to FIG. 3, the manner in which the elements are secured together is illustrated. Shown in section is an assembly of wooden elements 16 comprising two side pieces 16a and 16b of lesser vertical height than the central wooden elements 17 which may be a composite of the type shown in copending application Ser. No. 342,823 filed Dec. 31, 1979. An upper clamping member, formed as a metal strip having a shape conforming to that of the beam with which it is to be used, is superimposed on the beam and it will be noted that the beam rests in the channel 10. Bolts 18 are used to clamp the clamping member 15 securely down, pressing the beam 16 securely into the channel.

A pair of structural elements clamped into the channels in the above manner bear a fixed angular relationship to each other and it will be noted particularly that there is no need for predrilling of the wooden elements which would interfere with the strength of the wooden elements. Also, the structure of the invention eliminates the problem of having to align predrilled holes with preformed connectors.

If as illustrated in FIG. 1 the channel member 10 is extended down the leg 19 a substantial distance "A." The result is strengthening of the leg 19 so that lumber of a smaller size can be used than would otherwise be necessary. For example, in a composite construction that would normally require three 2 by 12 wooden elements the extension of the channels down ½ of the length of the wooden elements provides sufficient additional strength that 2 by 10 lumber may be used.

The embodiments of the invention in which an exclusive property or privilege is claimed are defined as follows:

1. A connector for rigidly joining two adjacent structural elements in a truss, with each structural element being constituted by an assembly of face to face wooden elements providing a beam comprising:

a pair of channel members joined together at an angle so that one of said beams can be positioned with the side edges of said wooden elements confined within the channel of each channel member, the channel of said channel members forming three sides of a rectangle to receive said side edges and having outwardly extending elements with bolt-receiving holes;

brace means connected to the channel members for maintaining said angle;

clamping means of channel shape in which the channel forms three sides of a rectangle for clamping the ends of said two adjacent structural elements securely into the channels of said channel members with the other side edge of at least one of said wooden elements confined within the channel of said clamping means, said clamping means having outwardly extending elements with bolt-receiving holes; and bolt means for compressing said clamping means toward said channel members, said clamping means comprising axially spaced apart clamping strips, each strip located opposite a pair of holes in the outwardly extending elements of said channel members to receive said bolts in aligned holes in said strips and said channel members, whereby tightening of the bolts compresses the strips against a structural element to clamp the side edges of said wooden elements in the channels of said channel members and oppositely disposed clamping strips.

2. In combination, a connector rigidly joining two adjacent structural elements in a truss, each structural element being constituted by an assembly of face to face wooden elements providing a beam comprising:

a pair of channel members joined together at an angle with one of said beams being positioned with the side edges of said wooden elements confined within the channel of each channel member, said channel members having outwardly extending elements with bolt-receiving holes;

brace means connected to the channel members for maintaining said angle;

clamping means of channel shape clamping the ends of said two adjacent structural elements securely into the channels of said channel members with the other side edges of at least one of said wooden elements confined within the channel of said clamping means, said clamping means having outwardly extending elements with bolt-receiving holes; and bolt means extending through the holes of said clamping means and said channel members for compressing said clamping means toward said channel members, said clamping means comprising axially spaced apart clamping strips, each strip located opposite a pair of holes in the outwardly extending elements of said channel members to receive said bolts in aligned holes in said strips and said channel members, whereby tightening of the bolts compresses the strips against a structural element to clamp the side edges of said wooden elements in the channels of said channel members and oppositely disposed clamping strips.

3. A connector combination as defined in claim 2 in which there are three face to face wooden boards in said beam, said boards being arranged with the central board being wider than the two outermost boards.

* * * * *